US010802569B2

(12) United States Patent
Gomi et al.

(10) Patent No.: US 10,802,569 B2
(45) Date of Patent: Oct. 13, 2020

(54) SEMICONDUCTOR DEVICE AND METHOD OF CONTROLLING SEMICONDUCTOR DEVICE INCLUDING CONTROLLING A PLURALITY OF CORES

(71) Applicant: Renesas Electronics Corporation, Tokyo (JP)

(72) Inventors: Takahiko Gomi, Tokyo (JP); Ryu Nagasawa, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 59 days.

(21) Appl. No.: 16/004,878

(22) Filed: Jun. 11, 2018

(65) Prior Publication Data

US 2019/0004593 A1    Jan. 3, 2019

(30) Foreign Application Priority Data

Jun. 30, 2017    (JP) .................................. 2017-128159

(51) Int. Cl.
| | | |
|---|---|---|
| G06F 1/00 | (2006.01) | |
| G06F 1/3287 | (2019.01) | |
| G06F 1/324 | (2019.01) | |
| G06F 1/3296 | (2019.01) | |
| G06F 1/3206 | (2019.01) | |
| G06F 1/20 | (2006.01) | |

(52) U.S. Cl.
CPC ............ *G06F 1/3287* (2013.01); *G06F 1/206* (2013.01); *G06F 1/324* (2013.01); *G06F 1/3206* (2013.01); *G06F 1/3296* (2013.01)

(58) Field of Classification Search
None
See application file for complete search history.

(56) References Cited

U.S. PATENT DOCUMENTS

| | | | |
|---|---|---|---|
| 9,037,882 B2 | 5/2015 | Vadakkanmaruveedu et al. | |
| 2003/0125900 A1* | 7/2003 | Orenstien | G06F 1/3203 |
| | | | 702/132 |
| 2005/0040810 A1 | 2/2005 | Poirier et al. | |
| 2009/0089543 A1* | 4/2009 | Gunther | G06F 9/30181 |
| | | | 712/30 |
| 2012/0110352 A1 | 5/2012 | Branover et al. | |
| 2013/0159755 A1 | 6/2013 | Presant et al. | |
| 2015/0194969 A1 | 7/2015 | Kawabe et al. | |
| 2017/0075397 A1* | 3/2017 | Saeidi | G06F 1/206 |
| 2017/0192473 A1* | 7/2017 | Lee | G06F 1/206 |

FOREIGN PATENT DOCUMENTS

| | | | |
|---|---|---|---|
| JP | 2005-071364 A | 3/2005 | |
| JP | 2013-546070 A | 12/2013 | |
| WO | WO 00/26747 A1 | 5/2000 | |

OTHER PUBLICATIONS

European Search Report dated Nov. 22, 2018 for European Patent Application No. 18177461.3-1216.

* cited by examiner

*Primary Examiner* — Nitin C Patel
(74) *Attorney, Agent, or Firm* — McGinn IP Law Group, PLLC

(57) ABSTRACT

The semiconductor device includes a plurality of cores, a sensor for detecting a temperature, and a control circuit configured to obtain each power consumption of the respective cores so as to select the core as a control object in accordance with the obtained power consumption.

20 Claims, 8 Drawing Sheets

SEMICONDUCTOR DEVICE AND METHOD OF CONTROLLING SEMICONDUCTOR DEVICE INCLUDING CONTROLLING A PLURALITY OF CORES

CLAIM OF PRIORITY

The present application claims priority from Japanese patent application JP2017-128159 filed on Jun. 30, 2017, the content of which is hereby incorporated by reference into this application.

BACKGROUND

The disclosure relates to a semiconductor device, which is applicable to the semiconductor device with heat generation controlling function.

Development of the semiconductor processing has been accelerated to meet market needs for large capacity, high performance, and low manufacturing cost of the semiconductor integrated circuit device. Meanwhile, the improvement in the semiconductor processing has shown the recent trend of increasing power consumption. In the above-described circumstances, the importance of heat generation control has been increasingly focused.

For example, Japanese Unexamined Patent Application Nos. 2005-71364 and 2013-546070 disclose that the temperature sensor that is allocated for each of a plurality of cores provides information on detected temperature, based on which each heat generation control of the respective cores is executed.

SUMMARY

The temperature information from the respective temperature sensors serves to trigger the heat generation control. The cores each having the temperature sensor are arranged adjacently with one another, thus causing temperature interference between the adjacent cores. This may interfere with identification of the core (module) as the heat generation source. In the case of temperature increase owing to the temperature interference, the heat generation control is likely to unnecessarily limit the function, resulting in difficulty in execution of the appropriate heat generation control.

The other problems and new characteristics will be clarified by the description and drawings as described below.

The disclosure will be briefly explained as a typical example.

The semiconductor device obtains each power consumption of the respective cores in response to the temperature detected by the sensor. The core as a control object is selected in accordance with the obtained power consumption.

The semiconductor device as described above allows appropriate heat generation control.

DESCRIPTION OF THE PREFERRED EMBODIMENT

Figure 1:
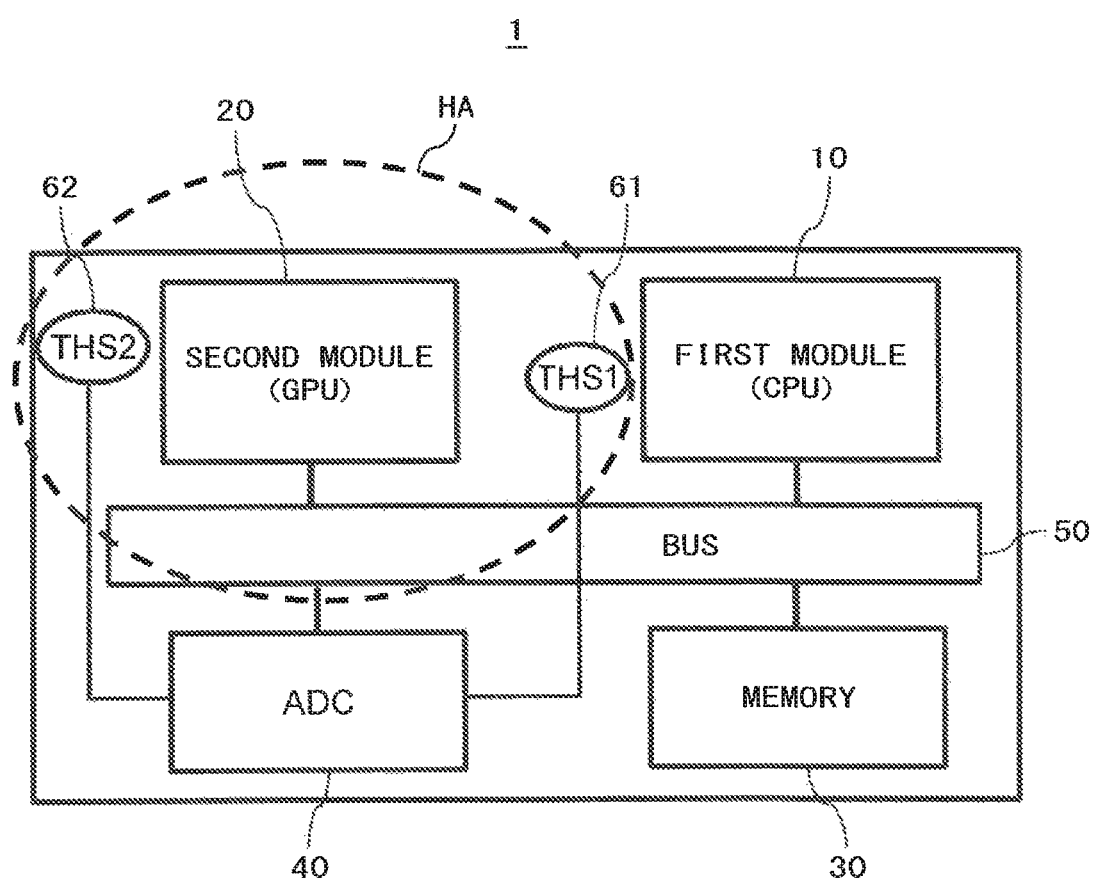
FIG. 1 is an explanatory view of a semiconductor device configured to execute a heat generation control.

The temperature control using a plurality of temperature sensors (comparative example) will be described as the technique that has been examined prior to disclosure of the present invention. FIG. 1 is a block diagram of the semiconductor device configured to execute the heat generation control.

A single semiconductor chip of a semiconductor device 1 includes a first module 10, a first temperature sensor (THS1) 61, a second module 20, a second temperature sensor (THS2) 62, a memory 30, an AD converter (ADC) 40, and a bus 50. The first module 10 is a central processing unit (CPU), and the second module 20 is a graphic processing unit (GPU). The first temperature sensor (THS1) 61 is allocated adjacent to the first module 10, and the second temperature sensor (THS2) 62 is allocated adjacent to the second module 20. The AD converter (ADC) 40 converts the temperature information from the first temperature sensor (THS1) 61 and the second temperature sensor (THS2) 62 into digital information.

The heat generation control of the first module 10 is executed based on the temperature information of the first temperature sensor (THS1) 61. The heat generation control of the second module 20 is executed based on the temperature information of the second temperature sensor (THS2) 62. The heat generation control is executed to suppress heat generation by reducing the clock frequency and the source voltage.

During graphic application operation, there may be the case that the load applied to the GPU 20 becomes high (for example, operating ratio ranging from 90 to 95%), and the load applied to the CPU 10 is kept low (for example, operating ratio equal to or lower than 15%). Heat generation HA in the GPU 20 will raise not only the temperature of the second temperature sensor (THS2) 62 adjacent to the GPU 20 but also the temperature of the first temperature sensor (THS1) 61 adjacent to the CPU 10, resulting in temperature interference. The heat generation of the CPU 10 is controlled based on the temperature information of the first temperature sensor (THS1) 61. Even if the CPU 10 adjacent to the first temperature sensor (THS1) 61 is not the heat generation source, the heat generation control of the CPU 10 is executed because of temperature rise of the first temperature sensor (THS1) 61 adjacent to the CPU 10. The heat generation control as described above may unnecessarily deteriorate performance of the CPU 10, influencing its interrupt control. The above-described heat transmission caused by the external factor has been found out as the problem that triggers inefficient heat generation control.

In the embodiment, upon actual heat generation control, it is determined whether the detected temperature abnormality has been caused by heat generated in the module as the control object. The module to be subjected to the heat generation control may be identified by calculating the power consumption value of the module as the heat generation control object. The appropriate module to be subjected to the heat generation control is selected in reference to the correlation with the prepared value of reference power. This makes it possible to select the proper module among those subjected to the heat generation control for the appropriate heat generation control.

An example and its modification will be described referring to the drawings. In the following description, the same components will be designated with the same codes, and repetitive explanations thereof, thus will be omitted.

Example

Figure 2:
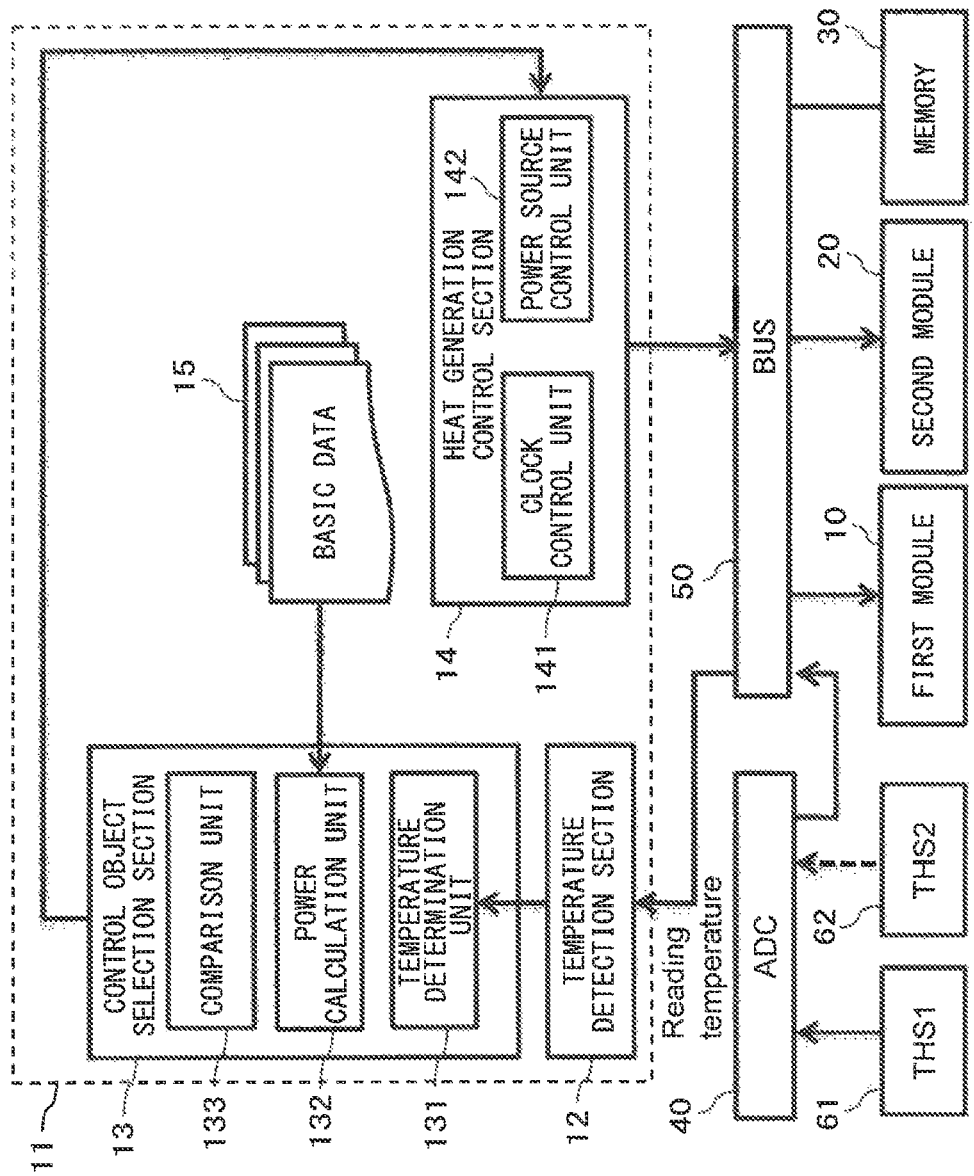
FIG. 2 is a block diagram explaining an exemplary structure of the semiconductor device as shown in FIG. 1.

The semiconductor device as an example will be described referring to FIGS. 1 and 2. FIG. 2 is a block diagram showing a structure example of the semiconductor device as shown in FIG. 1.

As FIG. 1 shows, the single semiconductor chip of the semiconductor device 1 includes the first module 10, the first temperature sensor (THS1) 61, the second module 20, the second temperature sensor (THS2) 62, the memory 30, the AD converter (ADC) 40, the bus 50, and a control circuit 11. The first module 10 is the central processing unit (CPU), and the second module 20 is the graphic processing unit (GPU). As FIG. 1 shows, the first temperature sensor (THS1) 61 is allocated adjacent to the first module 10, and the second temperature sensor (THS2) 62 is allocated adjacent to the second module 20. For example, the AD converter (ADC) 40 converts the temperature information of the first temperature sensor (THS1) 61 and the temperature information of the second temperature sensor (THS2) 62 into digital information.

As FIG. 2 shows, the control circuit 11 includes a temperature detection section 12, a control object selection section 13, and a heat generation control section 14. The control object selection section 13 includes a temperature determination unit 131 configured to determine whether execution of the temperature control is necessary, a power calculation unit 132 configured to calculate the power consumption value based on basic data 15 for selecting the heat generation control object, and a comparison unit 133 configured to select the heat generation control object based on the obtained data.

The temperature detection section 12 obtains temperature data from the first temperature sensor (THS1) 61. For example, diodes may be employed as the first temperature sensor (THS1) 61 and the second temperature sensor (THS2) 62. The voltage of the diode to which the constant current flows between terminals will vary in accordance with the temperature. The constant current is applied to the diode, and the voltage between both terminals of the diode is measured so as to detect the temperature based on the voltage which varies with the temperature change. The analog voltage value is digitized through AD conversion by the ADC 40. The temperature detection section 12 obtains the temperature corresponding to the digitized voltage value using the table representing the temperature-voltage relationship, and formulae.

The temperature determination unit 131 compares the obtained temperature data with a predetermined temperature threshold so as to determine the start of the temperature control. The power calculation unit 132 calculates a power consumption value of the module as the heat generation control object based on the basic data 15 such as dynamic element power and leakage power to be described later, and the load information (operating ratio) or the like which is obtained in real time. The comparison unit 133 selects the module to be subjected to the heat generation control among those as heat generation control objects in reference to the correlation between the power consumption calculated by the power calculation unit 132 and the predetermined reference power.

The heat generation control section 14 executes the heat generation control of the module as the heat generation control object selected by the control object selection section 13 by limiting the function. The heat generation control section 14 includes a power source control unit 142 and a clock control unit 141. The power source control unit 142 executes a power source control (adjustment of the source voltage) of the module to be subjected to the heat generation control. The clock control unit 141 executes a clock control (adjustment of the operating frequency) of the module to be subjected to the heat generation control.

The control circuit 11 may be constituted by the CPU (Central Processing Unit), the memory for program storage, and/or other circuit. The control circuit 11 may be configured in an arbitrary form of only hardware, only software, or combination of hardware and software. The control circuit 11 may be constituted by the CPU 10 and the memory 30, for example.

Figure 3:
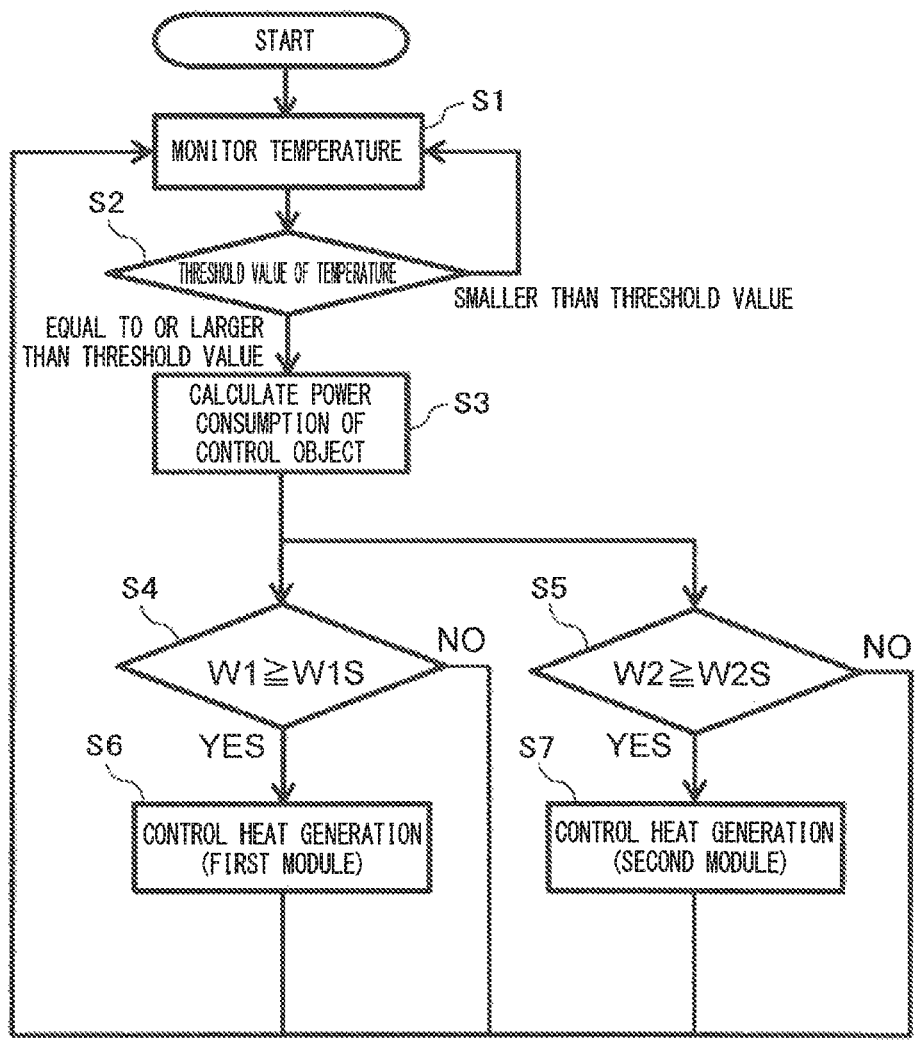
FIG. 3 is a flowchart explaining process steps of implementing the function of selecting the heat generation control executed by the semiconductor device as shown in FIG. 2.
Figure 4:
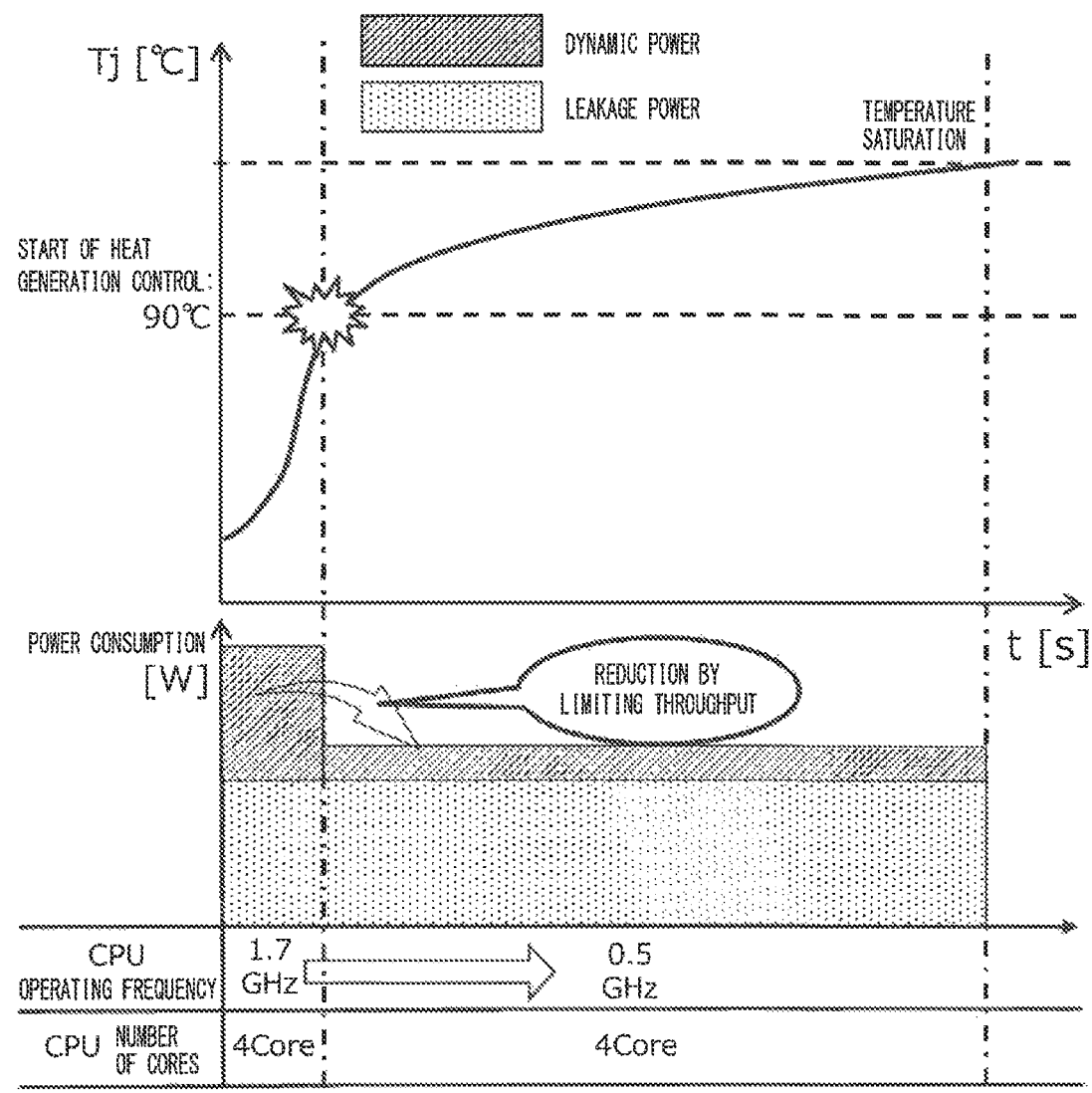
FIG. 4 is a view explaining the starting temperature of the heat generation control executed by the semiconductor device as shown in FIG. 2 as well as execution of the heat generation control.
Figure 5:
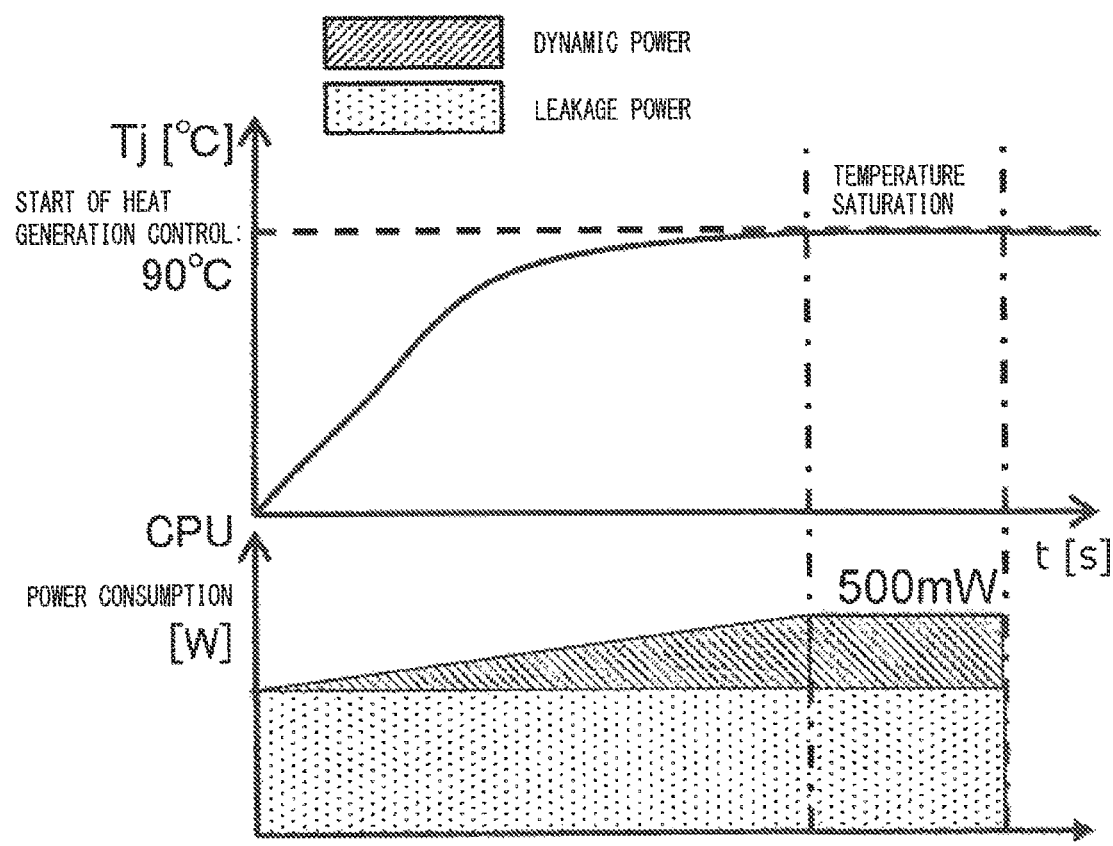
FIG. 5 is a view explaining the power consumption required to reach the predetermined temperature, which varies in accordance with the position of the temperature sensor.
Figure 6:
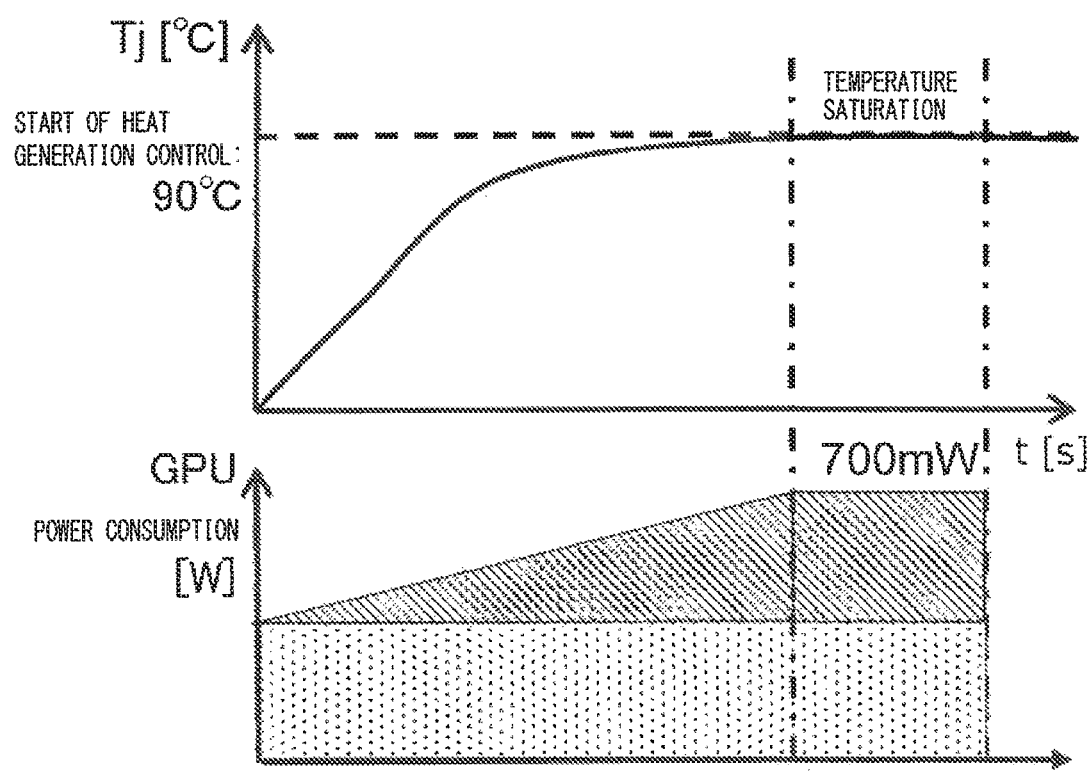
FIG. 6 is a view explaining the power consumption required to reach the predetermined temperature, which varies in accordance with the position of the temperature sensor.

The heat generation control of the semiconductor device as shown in FIG. 2 will be described referring to FIGS. 3 to 6. FIG. 3 is a flowchart representing process steps of implementing the function of selecting the heat generation control executed by the semiconductor device as shown in FIG. 2. FIG. 4 is a view representing the starting temperature of the heat generation control as well as the control executed by the semiconductor device as shown in FIG. 2. FIG. 5 is a view explaining the reference power of the CPU. FIG. 6 is a view explaining the reference power of the GPU.

(Temperature monitoring-Temperature threshold)

Steps S1, S2: The temperature detection section 12 obtains temperature information from the first temperature sensor (THS1) 61 via the ADC 40. The temperature determination unit 131 confirms whether the obtained temperature information exceeds the starting temperature of the heat generation control by executing a polling processing. In the example, it is assumed that, for example, the heat generation control is started at the temperature of the first temperature sensor (THS1) 61 equal to or higher than 90° C. as the temperature threshold. The heat generation control executes limiting the function (throughput) in such a way that the temperature is saturated at the target temperature (for example, does not exceed 100° C.). The heat generation control executes suppressing heat generation by controlling the operating frequency of the CPU 10 as shown in FIG. 4. For example, the dynamic power may be reduced by lowering the operating frequency from 1.7 GHz to 0.5 GHz. For example, the CPU 10 may be constituted by four cores. In this example, the number of the cores is not reduced. It is possible to reduce the dynamic power by decreasing the number of operating cores, or by lowering the source voltage. It is also possible to detect the temperature of the second temperature sensor (THS2) 62 instead of the first temperature sensor (THS1) 61, or to detect both temperatures of the first temperature sensor (THS1) 61 and the second temperature sensor (THS2) 62.

(Calculation of power consumption of control object)

Step S3: The power calculation unit 132 calculates the power consumption value of the module as the heat generation control object (CPU 10, GPU 20).

The power consumption may be expressed as the sum of the dynamic power and the leakage power as represented by the following formula (1).

power consumption [mW]=dynamic power [mW]+ leakage power [mW]  (1)

The dynamic power is expressed as the multiplication of the dynamic element power and the effective frequency as represented by the following formula (2). The effective frequency is expressed as the multiplication of the operating frequency and the operation ratio as represented by the following formula (3).

dynamic power [mW]=dynamic element power [mW/MHz]×effective frequency [MHz]  (2)

Effective frequency [MHz]=operating frequency [MHz]×operating ratio [MHz]  (3)

The dynamic element power is expressed as the multiplication of the load capacity and the second power of source voltage. Assuming that the dynamic element power is expressed as $W_E$, the load capacity is expressed as C, and the source voltage is expressed as V, the dynamic element power may be expressed by the following formula (4). The load capacity is preliminarily obtained from design values of the semiconductor device as the basic data.

$$W_E = C \times V^2 \quad (4)$$

The operating ratio is obtained in real time by the operating system.

The leakage power may be expressed by the multiplication of the leakage current and the voltage. The leakage current may be derived from the following formula (5) using the leakage current $i_L$ per single transistor, the total number of transistors N, and the shutdown rate r.

$$I_L = i_L \times N \times (1-r) \quad (5)$$

The leakage current $i_L$ per single transistor may be expressed by the following formula (6) using the coefficient α [A/nm], the gate width W [nm], the voltage threshold $V_r$ [V], the sub-threshold coefficient n, Boltzmann's constant k=1.38×10$^{-23}$ [J/K], the absolute temperature T [K], and the quantum of electricity q=1.6×10$^{-19}$ [C]. The coefficient α and the sub-threshold coefficient n may be obtained through experiments.

$$i_L = \alpha \times W \times \exp\{-V_r \times q/(n \times kT)\} \quad (6)$$

The basic data 15 as shown in FIG. 2 include parameters required for calculating the above-described dynamic power and the leakage power. The basic data 15 are stored in the memory 30 (see FIG. 2), for example.

(Comparison of Power)

Steps S4, S5: The comparison unit 133 compares the power consumption of the module as the heat generation control object, which has been calculated in step S3 with the reference power. In step S4, it is determined whether the power consumption (W1) of the CPU 10 as the first module is equal to or higher than the reference power (W1S). If YES is obtained, the process proceeds to step S6. If NO is obtained, the process returns to step S1. In step S5, it is determined whether the power consumption (W2) of the GPU 20 as the second module is equal to or higher than the reference power (W2S). If YES is obtained, the process proceeds to step S7. If NO is obtained, the process returns to step S1. The reference power has to be preliminarily defined. In this case, the reference power is defined as the power consumption required to reach the starting temperature (example: 90° C.) of the heat generation control.

The power consumption required to reach the specific temperature may vary depending on the positional correlation between the module as the heat generation control object and the temperature sensor.

As FIG. 1 shows, the second temperature sensor (TSH2) 62 is allocated adjacent to the GPU 20, and the first temperature sensor (THS1) 61 is allocated adjacent to the CPU 10. In the above-described arrangement, the temperature of the first temperature sensor (THS1) 61 is monitored. Referring to FIG. 5, as the CPU 10 is allocated adjacent to the first temperature sensor (THS1) 61, the power consumption required to reach the temperature of 90° C. is 500 mW. Meanwhile, referring to FIG. 6, as the GPU 20 is allocated remotely from the first temperature sensor (THS1) 61, the temperature thereof is unlikely to rise. The power consumption of 700 mW that is higher than 500 mW is necessary to bring the temperature of the first temperature sensor (THS1) 61 to 90° C. The reference power value has to be preliminarily calculated. However, it is possible to calculate the power consumption value required to reach the arbitrary temperature of the specific temperature sensor in reference to the radiation performance of the board, each power consumption of the respective modules, and the like.

Step S6: The heat generation control section 14 executes the heat generation control of the CPU 10 as the first module. The heat generation control section 14 controls at least one of the operating frequency and the source voltage of the CPU 10.

Step S7: The heat generation control section 14 executes heat generation control of the GPU 20 as the second module. The heat generation control section 14 controls at least one of the operating frequency and the source voltage of the GPU 20.

(Example of Calculation)

Three patterns for calculating power consumption values of the modules as heat generation control objects using formulae (1), (2), (3), and comparison of power values will be described below. The respective values are specified as follows.

First module (CPU):
Operating frequency: 500 MHz-1700 MHz
Dynamic element power: 0.46 mW/MHz
Leakage power: 150 mW (@Tj=90° C.)
Second module (GPU):
Operating frequency: 200 MHz-600 MHz
Dynamic element power: 0.50 mW/MHz
Leakage power: 600 mW (@Tj=90° C.)

(Pattern 1)

Parameters are set as below.
First reference power (W1S): 500 mW
Second reference power (W2S): 700 mW
Operating frequency of CPU 10: 1700 MHz
Operating ratio of CPU 10: 90%
Operating frequency of GPU 20: 600 MHz
Operating ratio of GPU 20: 90%

The power consumption of the CPU 10 at Tj=90° C. may be obtained as follows.
Effective frequency=1700 MHz×90%=1530 MHz
Dynamic power=0.46 mW/MHz×1530 MHz=703.8 mW
Power consumption=703.8 mW+150 mW=853.8 mW Accordingly, the power consumption (W1) of the first module becomes 853.8 mW (W1=853.8 mW).

The same as the above description, the power consumption of the GPU 20 at Tj=90° C. may be obtained as follows.
Effective frequency=600 MHz×90%=540 MHz
Dynamic power=0.50 mW/MHz×540 MHz=270 mW
Power consumption=270 mW+600 mW=870 mW
Accordingly, the power consumption (W2) of the second module becomes 870 mW (W2=870 mW).

In the case of the CPU 10, the relationship of W1=853.8 mW>W1S=500 mW establishes W1≥W1S in step S4, requiring execution of the heat generation control. In the case of the GPU 20, the relationship of W2=870 mW>W2S=700 mW establishes W2≥W2S in step S5, requiring execution of the heat generation control. As both the CPU 10 and the GPU 20 are determined as heat generation sources, the heat generation control will execute in steps S6 and S7.
(Pattern 2)

Parameters are set as below.
First reference power (W1S): 500 mW
Second reference power (W2S): 700 mW
Operating frequency of CPU 10: 1700 MHz
Operating ratio of CPU 10: 20%
Operating frequency of GPU 20: 600 MHz
Operating ratio of GPU 20: 90%.

The power consumption of the CPU 10 at Tj=90° C. may be obtained as follows.
Effective frequency=1700 MHz×20%=340 MHz
Dynamic power=0.46 mW/MHz×340 MHz=156.4 mW
Power consumption=156.4 mW+150 mW=306.4 mW
Accordingly, the power consumption (W1) of the first module becomes 306.4 mW (W1=306.4 mW).

The same as the above description, the power consumption of the GPU 20 at Tj=90° C. may be obtained as follows.
Effective frequency=600 MHz×90%=540 MHz
Dynamic power=0.50 mW/MHz×540 MHz=270 mW
Power consumption=270 mW+600 mW=870 mW
Accordingly, the power consumption (W2) of the second module becomes 870 mW (W2=870 mW).

In the case of the CPU 10, the relationship of W1=306.4 mW<W1S=500 mW fails to establish W1≥W1S in step S4, requiring no execution of the heat generation control. In the case of the GPU 20, the relationship of W2=870 mW W2S=700 mW establishes W2≥W2S in step S5, requiring execution of the heat generation control. As only the GPU 20 is the heat generation source, the heat generation control will execute in step S7.
(Pattern 3)

Parameters are set as below.
First reference power (W1S): 500 mW
Second reference power (W2S): 700 mW
Operating frequency of CPU 10: 1700 MHz
Operating ratio of CPU 10: 90%
Operating frequency of GPU 20: 600 MHz
Operating ratio of GPU 20: 90%

The power consumption of the CPU 10 at Tj=90° C. may be obtained as follows.
Effective frequency=1700 MHz×90%=1530 MHz
Dynamic power=0.46 mW/MHz×1530 MHz=703.8 mW
Power consumption=703.8 mW+150 mW=853.8 mW
Accordingly, the power consumption (W1) of the first module becomes 853.8 mW (W1=853.8 mW).

The same as the above description, the power consumption of the GPU 20 at Tj=90° C. may be obtained as follows.
Effective frequency=600 MHz×20%=120 MHz
Dynamic power=0.50 mW/MHz×120 MHz=60 mW
Power consumption=60 mW+600 mW=660 mW
Accordingly, the power consumption (W2) of the second module becomes 660 mW (W2=660 mW).

In the case of the CPU 10, the relationship of W1=853.8 mW>W1S=500 mW establishes W1≥W1S in step S4, requiring execution of the heat generation control. In the case of the GPU 20, the relationship of W2=660 mW<W2S=700 mW fails to establish W2≥W2S in step S5, requiring no execution of the heat generation control. As the only CPU 10 is the heat generation source, the heat generation control will execute in step S6.

In the example, the control object selection section provides for appropriate selection of the module to be subjected to the heat generation control based on each power consumption of the modules as the heat generation control objects. In this example, the first temperature sensor (THS1) 61 is used for temperature monitoring. However, it is possible to use the second temperature sensor (THS2) 62, or both the first temperature sensor (THS1) 61 and the second temperature sensor (THS2) 62 for temperature monitoring. The temperature monitoring requires at least one of those temperature sensors.

Modified Example

A representative modification of the example will be described. In the following modified example, the components with similar structures and similar functions to those explained in the above example will be designated with the same codes. Explanations of those components will be made in the similar manner to those described above so long as technical consistency is maintained. The description of the example may be partially subjected to a specific application, and the description of the modified example may also be subjected to the application complexly either entirely or partially so long as the technical consistency is maintained.

In the example, it is determined whether execution of the heat generation control is necessary by using at least one of the temperature sensors. Power consumption values of all the modules as the heat generation control objects are calculated so as to select the module to be actually subjected to the heat generation control. In the modified example, it is determined whether execution of the heat generation control is necessary by using at least one of the temperature sensors. The power consumption value of the single module as the heat generation control object is calculated. Based on temperatures of the respective temperature sensors for all the modules as the heat generation control objects, and the power consumption value of the single module as the heat generation control object, the module to be actually subjected to the heat generation control may be selected.

Figure 7:
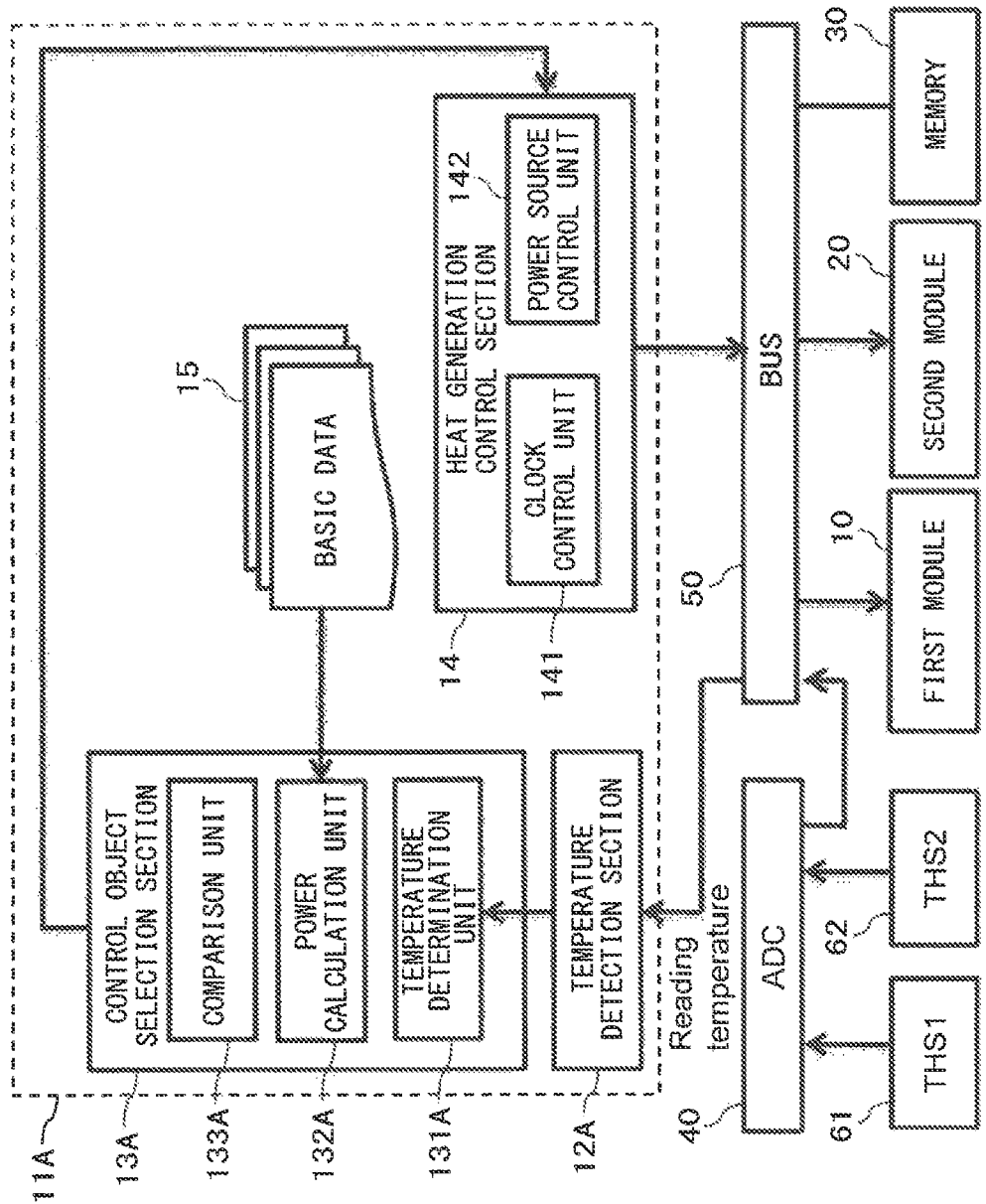
FIG. 7 is a block diagram as a modified example, explaining an exemplary structure of the semiconductor device as shown in FIG. 1.

The semiconductor device according to the modified example will be described referring to FIG. 7. FIG. 7 is a block diagram of the structure of the semiconductor device according to the example. A semiconductor device 1A according to the modified example is similar to the semiconductor device 1 of the example except a control circuit 11A.

A single semiconductor chip of the semiconductor device 1A includes the first module 10, the first temperature sensor (THS1) 61, the second module 20, the second temperature sensor (THS2) 62, the memory 30, the AD converter (ADC) 40, the bus 50, and the control circuit 11A. The first module 10 is the central processing unit (CPU), and the second module 20 is the graphic processing unit (GPU). As FIG. 1 shows, the first temperature sensor (THS1) 61 is allocated adjacent to the first module 10, and the second temperature sensor (THS2) 62 is allocated adjacent to the second module 20. For example, the AD converter (ADC) 40 is configured to convert the temperature information of both the first temperature sensor (THS1) 61 and the second temperature sensor (THS2) 62 into digital information.

The control circuit 11A includes a temperature detection section 12A, a control object selection section 13A, and the heat generation control section 14. The control object selection section 13A includes a temperature determination unit 131A for determining whether execution of the temperature control is necessary, a power calculation unit 132A for calculation of the power consumption based on the basic data 15 for selecting the heat generation control object, and a comparison unit 133A for selection of the heat generation control object based on the obtained data.

The temperature detection section 12A obtains temperature data from the first temperature sensor (THS1) 61 and the second temperature sensor (THS2) 62, respectively.

The temperature determination unit 131A compares the temperature data derived from, for example, the first temperature sensor (THS1) 61 with the predetermined temperature threshold so as to determine the start of the temperature control. The power calculation unit 132A calculates the power consumption value of the module as the heat generation control object (for example, the CPU 10 as the first module) based on the basic data 15 such as the dynamic element power and the leakage power, and the load information (operating ratio) obtained in real time. The comparison unit 133A selects the module as the heat generation control object in reference to the correlation between the temperature data derived from the first temperature sensor (THS1) 61 and the temperature data derived from the second temperature sensor (THS2) 62, and the correlation between the power consumption value calculated by the power calculation unit 132A and the predetermined reference power value.

Figure 8:
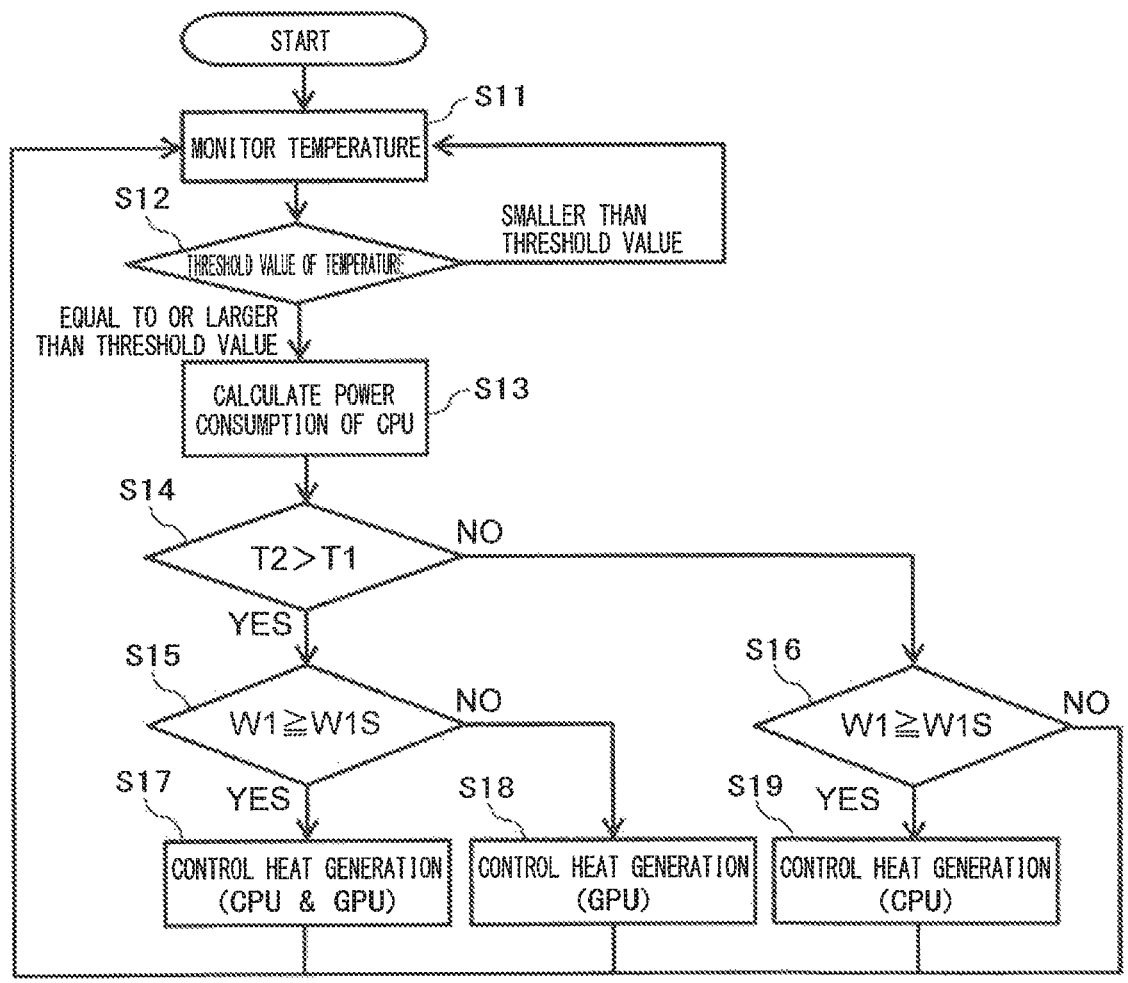
FIG. 8 is a view explaining process steps of implementing the function of selecting the heat generation control executed by the semiconductor device as shown in FIG. 7.

The heat generation control of the semiconductor device as shown in FIG. 7 will be described referring to FIG. 8. FIG. 8 is a flowchart of process steps of implementing the function of selecting the heat generation control.

(Temperature Monitoring-Temperature Threshold)

Steps S11, S12: The same as the example as described above, based on the temperature information derived from at least one of the temperature sensors, it is determined whether execution of the heat generation control is necessary. In this case, the temperature information data of all the temperature sensors are obtained.

(Calculation of Power Consumption Value)

Step S13: The power consumption value is calculated in the similar manner to the example. The power consumption value of one of the modules as the heat generation control objects is calculated. FIG. 8 shows that the power consumption value of the CPU 10 is calculated.

(Comparison of Temperature-Comparison of Power)

Step S14: The comparison unit 133A determines whether the temperature (T2) derived from the second temperature sensor (THS2) 62 is higher than the temperature (T1) derived from the first temperature sensor (THS1) 61. If YES is obtained, the process proceeds to step S15. If NO is obtained, the process proceeds to step S16.

Step S15: The comparison unit 133A determines whether the power consumption (W1) of the CPU 10, which has been calculated in step S13 is equal to or higher than the reference power (W1S). If YES is obtained, the process proceeds to step S17. If NO is obtained, the process proceeds to step S18.

Step S16: The same as step S15, the comparison unit 133A determines whether the power consumption (W1) of the CPU 10 is equal to or higher than the reference power (W1S). If YES is obtained, the process proceeds to step S19. If NO is obtained, the process returns to step S11.

Step S17: The heat generation control section 14 executes the heat generation control of the CPU 10 and the GPU 20. The heat generation control section 14 controls at least one of the operating frequency and the source voltage of the CPU 10, and controls at least one of the operating frequency and the source voltage of the GPU 20. The CPU 10 is subjected to the heat generation control in accordance with W1 W1S. And also, the GPU 20 is subjected to the heat generation control in accordance with T2 (GPU)>T1 (CPU).

Step S18: The heat generation control section 14 executes the heat generation control of the GPU 20. The heat generation control section 14 controls at least one of the operating frequency and the source voltage of the GPU 20. The CPU 10 fails to be subjected to the heat generation control in accordance with W1<W1S. But the GPU 20 is subjected to the heat generation control in accordance with T2 (GPU)>T1 (CPU).

Step S19: The heat generation control section 14 executes the heat generation control of the CPU 10. The heat generation control section 14 controls at least one of the operating frequency and the source voltage of the CPU 10. The CPU 10 is subjected to the heat generation control in accordance with W1 W1S. But the GPU 20 fails to be subjected to the heat generation control in accordance with T2 (GPU)<T1 (CPU).

(Example of Calculation)

An explanation will be made concerning three example patterns of calculating the power consumption value of the module as the heat generation control object by using formulae (1), (2), (5) in accordance with the correlation between the temperature (T1) of the first temperature sensor (THS1) 61 and the temperature (T2) of the second temperature sensor (THS2) 62, and comparison of the obtained power consumption value with the reference power value. The conditions are set as below.

First module (CPU):
Operating frequency: 500 MHz-1700 MHz
Dynamic element power: 0.46 mW/MHz
Leakage power: 150 mW (@Tj=90° C.)
(Pattern 1)
First reference power (W1S): 500 mW
Operating frequency of CPU 10: 1700 MHz
Operating ratio of CPU 10: 90%
T1=90° C.
T2=110° C.

The power consumption value of the CPU 10 at T1=90° C. may be obtained as follows.
Effective frequency=1700 MHz×90%=1530 MHz
Dynamic power=0.46 mW/MHz×1530 MHz=703.8 mW
Power consumption=703.8 mW+150 mW=853.8 mW
Accordingly, the power consumption (W1) of the CPU 10 becomes 853.8 mW (W1=853.8 mW).

The relationships of T2=110° C.>T1=90° C., and W1=853.8 mW>W1S=500 mW establish T2>T1 in step S14, and W1≥W1S in step S15. Therefore, both the CPU 10 and the GPU 20 are heat generation sources as modules to be subjected to heat generation control (step S17).

(Pattern 2)
First reference power (W1S): 500 mW
Operating frequency of CPU 10: 1700 MHz
Operating ratio of CPU 10: 20%
T1=90° C.

T2=110° C.

The power consumption value of the CPU 10 at T1=90° C. may be obtained as follows.
Effective frequency=1700 MHz×20%=340 MHz
Dynamic power=0.46 mW/MHz×340 MHz=156.4 mW
Power consumption=156.4 mW+150 mW=306.4 mW
Accordingly, the power consumption (W1) of the CPU 10 becomes 306.4 mW (W1=306.4 mW).

The relationships of T2=110° C.>T1=90° C., and W1=306.4 mW<W1S=500 mW establish T2>T1 in step S14, but fail to establish W1≥W1S in step S15. Therefore, the GPU 20 is the heat generation source as the module to be subjected to the heat generation control (step S18).

(Pattern 3)
First reference power (W1S): 500 mW
Operating frequency of CPU 10: 1700 MHz
Operating ratio of CPU 10: 90%
T1=90° C.
T2=50° C.

The power consumption value of the CPU 10 at T1=90° C. may be obtained as follows.
Effective frequency=1700 MHz×90%=1530 MHz
Dynamic power=0.46 mW/MHz×1530 MHz=703.8 mW
Power consumption=703.8 mW+150 mW=853.8 mW
Accordingly, the power consumption (W1) of the CPU 10 becomes 853.8 mW (W1=853.8 mW).

The relationships of T2=50° C.<T1=90° C., and W1=853.8 mW>W1S=500 mW fail to establish T2>T1 in step S14, but establish W1≥W1S in step S16. Therefore, the CPU 10 is the heat generation source as the module to be subjected to the heat generation control (step S19).

The modified example allows appropriate selection of the module to be subjected to the heat generation control among a plurality of modules as heat generation control objects based on the power consumption value of one of those modules as the heat generation control objects, and a correlation among a plurality of temperature sensors. Compared with the example, the modified example allows selection of the module in reference to the power consumption value of an arbitrary module as the heat generation control object and the correlation among a plurality of temperature sensors. As a result, the respective power consumption values of all the modules as the heat generation control objects do not have to be calculated.

The embodiment according to the present invention has been described as the example and the modified example. It is to be understood that the present invention is not limited to those described above, but may be further modified in various forms.

For example, the example and the modified example have been described on the assumption that two modules are subjected to the heat generation control. However, it is possible to subject three or more modules to the heat generation control without being limited to the two modules.

What is claimed is:

1. A semiconductor device comprising:
   a plurality of cores;
   a sensor for detecting a temperature; and
   a control circuit for obtaining each power consumption of the each of the plurality of cores in accordance with the temperature detected by the sensor, and for selecting a core from among the plurality of cores as a control object in accordance with the obtained power consumptions of each of the plurality of cores,
   wherein the control circuit executes a power consumption control of the selected core as the control object, and
   wherein the control circuit obtains each power consumption value of the respective cores in response to a result of comparison between the temperature detected by the sensor and a predetermined temperature threshold.

2. The semiconductor device according to claim 1,
   wherein the control circuit selects the core as the control object by using a result of a comparison between a value of the power consumption and a predetermined reference value.

3. The semiconductor device according to claim 2,
   wherein the control circuit selects the core as the control object by using a result of comparison between the obtained power consumption values of the cores and predetermined reference values of the power consumption for the cores.

4. The semiconductor device according to claim 3,
   wherein the control circuit controls at least one of an operating frequency and a source voltage of the selected core as the control object.

5. The semiconductor device according to claim 4,
   wherein a single unit of the sensor is allocated adjacent to one of the cores.

6. The semiconductor device according to claim 1,
   wherein the control circuit controls at least one of an operating frequency and a source voltage of the selected core as the control object.

7. The semiconductor device according to claim 1,
   wherein the control circuit selects the core as the control object by using a result of comparison between each value of the power consumption of the cores and predetermined reference values of the power consumption for the cores.

8. The semiconductor device according to claim 1,
   wherein a single unit of the sensor is allocated adjacent to one of the cores.

9. The semiconductor device according to claim 1, further comprising a memory, wherein:
   one of the cores is a CPU; and
   the control circuit includes the CPU and the memory.

10. The semiconductor device according to claim 1,
    wherein the control circuit selects the core as the control object by using a result of comparison between each value of the power consumption of the cores and predetermined reference values of the power consumption for the cores, and
    wherein the predetermined reference values of the power consumption of the respective cores are the respective power each core consumes such that the temperature detected by the sensor reaches the predetermined temperature threshold.

11. A method of controlling a semiconductor device comprising:
    detecting a temperature of at least one of a plurality of cores;
    comparing the detected temperature of at least one of the cores with a predetermined temperature threshold;
    obtaining each power consumption value of the cores in response to a comparison result;
    comparing the obtained power consumption values of the cores with predetermined reference power values for the cores;
    selecting a core from among the plurality of cores as a control object from the cores by using results of comparison between the power consumption values that are obtained and the predetermined reference power values for each respective one of the plurality cores; and
    executing a power consumption control of the selected core as the control object, and wherein the obtaining of each power consumption value of the respective cores in response to the results of comparison is between the temperature detected and the predetermined temperature threshold.

12. The method of controlling a semiconductor device according to claim 11, wherein at least one of an operating frequency and a source voltage of the selected core is controlled,
wherein the selecting the core as the control object is by using a result of comparison between each value of the power consumption of the cores and predetermined reference values of the power consumption for the cores, and
wherein the predetermined reference values of the power consumption of the respective cores are the respective power each core consumes such that the temperature detected reaches the predetermined temperature threshold.

13. A semiconductor device comprising:
a plurality of cores;
a plurality of sensors for detecting temperatures of the cores; and
a control circuit for selecting a core from among a plurality of cores as a control object in accordance with a result of comparison between the detected temperatures of each of the plurality of cores, and a power consumption value derived from one of the cores,
wherein the control circuit executes a power consumption control of the selected core as the control object, and
wherein the control circuit obtains each power consumption value of the respective cores in response to a result of comparison between the temperature detected by the sensor and a predetermined temperature threshold.

14. The semiconductor device according to claim 13, wherein the control circuit selects the core as the control object by using a result of comparison between each value of the power consumption of the cores and predetermined reference values of the power consumption for the cores, and
wherein the predetermined reference values of the power consumption of the respective cores are the respective power each core consumes such that the temperature detected by the sensor reaches the predetermined temperature threshold.

15. The semiconductor device according to claim 14, wherein the control circuit controls at least one of an operating frequency and a source voltage of the selected core.

16. The semiconductor device according to claim 15, wherein the control circuit selects the core as the control object in accordance with a result of comparison between the obtained power consumption value of the core and a predetermined reference value of the power consumption for the core.

17. The semiconductor device according to claim 16, wherein the control circuit obtains the power consumption value of the core, which is detected by the sensor at the temperature lower than another sensor.

18. The semiconductor device according to claim 13, wherein the control circuit controls at least one of an operating frequency and a source voltage of the selected core.

19. The semiconductor device according to claim 13, wherein the control circuit selects the core as a control object in accordance with a result of comparison between the obtained power consumption value of the core and a predetermined reference value of the power consumption for the core.

20. The semiconductor device according to claim 13, wherein the control circuit obtains the power consumption value of the core, which is detected by the sensor at the temperature lower than another sensor.

* * * * *